United States Patent [19]

Karsh

[11] 4,090,680

[45] May 23, 1978

[54] WEB LEADER, WEB WINDING METHODS AND WOUND WEB WITH LEADER

[75] Inventor: Irving Karsh, Los Angeles, Calif.

[73] Assignee: Bell & Howell Company, Chicago, Ill.

[21] Appl. No.: 674,539

[22] Filed: Apr. 7, 1976

[51] Int. Cl.$^2$ .......................... G03B 1/04; G11B 15/32
[52] U.S. Cl. ...................................... 242/195; 352/235
[58] Field of Search ........................ 242/195, 192, 197; 352/235, 129; 226/91, 92; 206/387, 398, 400; 360/95

[56] References Cited

U.S. PATENT DOCUMENTS

| | | | |
|---|---|---|---|
| 3,677,495 | 7/1972 | Villers et al. | 242/197 |
| 3,797,777 | 3/1974 | Hosono et al. | 242/197 |
| 3,809,218 | 5/1974 | Furst | 206/387 |

Primary Examiner—Leonard D. Christian
Attorney, Agent, or Firm—Benoit Law Corporation

[57] ABSTRACT

An article of manufacture has a web wound on a cylindrical hub and a web leader wound between the hub and the web. The web leader is stiffer than the web and has a first end at the hub. A first leader portion has a uniform thickness greater than the thickness of the web and extends from the first end to a second leader portion. The second leader portion tapers from the uniform thickness at the first leader portion to a reduced thickness at a second end which is attached to the web. The tapering second leader portion overlays the first end of the web leader, whereby the web leader between the hub and the web constitutes a cylindrical support for the wound web.

The disclosure extends to methods and articles for facilitating the winding of the web on a cylindrical hub, employing the above mentioned web leader.

30 Claims, 6 Drawing Figures

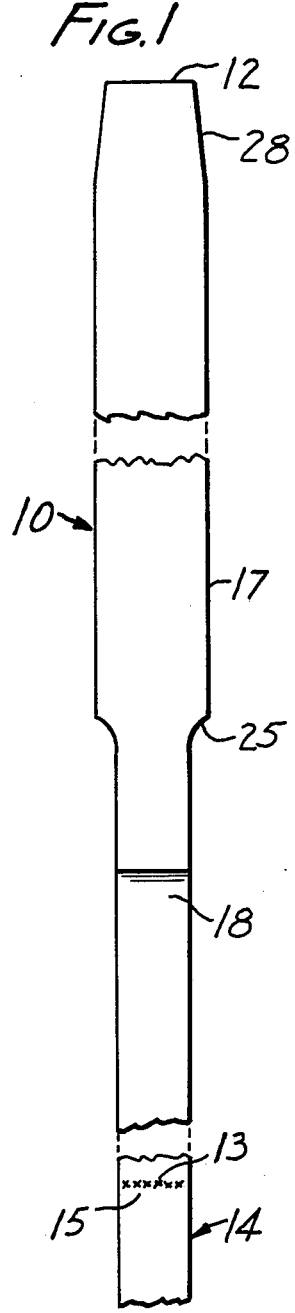
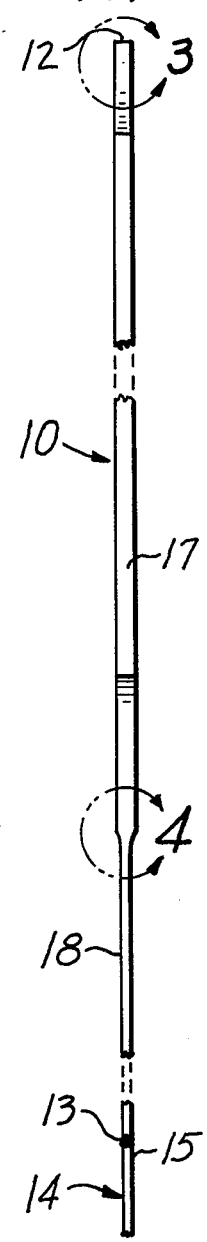
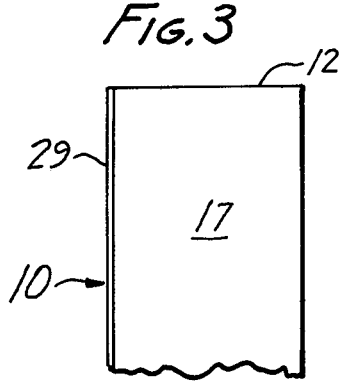
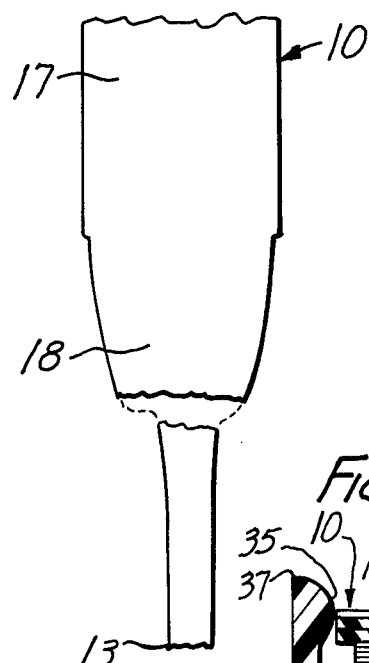
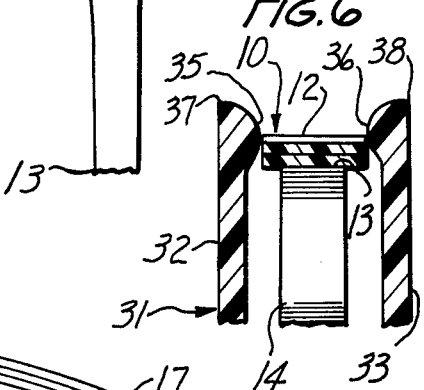
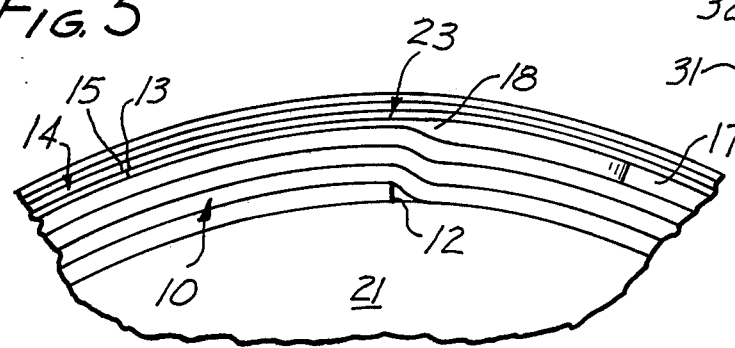

WEB LEADER, WEB WINDING METHODS AND WOUND WEB WITH LEADER

BACKGROUND OF THE INVENTION

1. Field of the Invention

The subject invention relates to methods and articles for facilitating the winding of a web on a cylindrical hub with the aid of a web leader, to wound web and web leader combinations, and to web leaders per se. Exemplary fields of utility of the invention include tape leader devices and techniques for magnetic recording and playback tape transports and film leader devices and techniques for motion picture projectors and other photographic film handling apparatus.

2. Description of the Prior Art

A large number of self-threading web transports, including magnetic recording tape and motion picture film transports, have become known and are in operation. Typically, these self-threading transports employ a leader which, being attached to the beginning of the web, is stiffer than the web itself and/or has other properties which render it more manageable by self-threading equipment. In some instances, leaders are utilized for signaling purposes in conjunction with an optical or other pickup in order to indicate to control equipment the beginning or completion of a recording, playback, or display operation, or for other known purposes.

In the overwhelming majority of cases, it has been found that the leader has to be thicker than the web in order to be able to perform its intended function. In consequence, when a web equipped with a typical prior-art leader is wound on a reel, spool or other winding facility having a cylindrical hub, there occurs a series of first bumps in a radial plane extending through the free end of the leader at the hub, as well as a second series of bumps coincident with a radial plane through the end of the leader to which the web is attached.

These bumps in the web roll have several known disadvantages, including the distortion of the roll from an ideal nearly perfect cylindrical configuration, the interference of the bump with the operation of peripheral roll drive equipment and, in the case of magnetic tape transports, the generation of signal distorting or degrading flutter.

I am aware in this connection of the U.S. Pat. No. 3,706,423, by Joseph J. Neff, issued Dec. 19, 1972 and proposing take-up and supply leaders being tapered toward their secured ends so that when these take-up and supply leaders are coupled to one another and wound about the reel hub, creases are not produced in the wound tape because of an abruptly changing significant thickness where the supply leader is secured to the tape and where the take-up leader is secured to the take-up reel hub. In practice, while workable in some instances, this prior-art approach still eventuates eccentricities and discontinuities in the wound web configuration.

SUMMARY OF THE INVENTION

It is an object of this invention to overcome the above mentioned disadvantages.

It is a related object of this invention to provide improved leaders for magnetic recording tapes, photographic films and other webs.

It is a germane object of this invention to achieve wound web rolls that, while including leaders, possess the qualities of leader-less web rolls.

It is also an object of this invention to provide improved articles of manufacture comprising a web winding device having a cylindrical hub, a web wound on the hub, and a web leader wound on the hub between the hub and the web and being stiffer than the web.

It is also an object of this invention to provide improved methods and articles of manufacture for facilitating the winding of a web on a cylindrical hub.

Other objects will become apparent in the further course of this disclosure.

From a first aspect thereof, the subject invention resides in an article of manufacture comprising in combination, web winding means having a cylindrical hub, a web wound on said hub, a web leader wound on said hub between said hub and said web and being stiffer than said web, said web leader having a first end at said hub, a first leader portion having a uniform thickness greater than the thickness of said web and extending from said first end to a second leader portion, said second leader portion tapering from said uniform thickness at said first leader portion to a reduced thickness at a second end attached to said web, and said tapering second leader portion overlaying said first end.

From another aspect thereof, the subject invention resides in a method of facilitating the winding of a web on a given hub, comprising in combination the steps of providing a web leader with a stiffness higher than the stiffness of said web, providing said web leader with a first leader portion having between a first leader end and a second leader portion a uniform thickness greater than the thickness of said web, tapering said second leader portion from said uniform thickness at said first leader portion to a reduced thickness at a second leader end, attaching said web to said second leader end, winding said web leader on said hub with said first end being located at said hub and being overlaid with said tapered second leader portion, and winding said web on said wound web leader on said hub.

From yet another aspect thereof, the subject invention resides in an article of manufacture for facilitating the winding of a web on a cylindrical hub, comprising a web leader being stiffer than said web and having a first end, said web leader having a first leader portion having a uniform thickness greater than the thickness of said web and extending from said first end to a second leader portion, said second leader portion tapering from said uniform thickness at said first leader portion to a reduced thickness at a second end attachable to said web, with said first leader portion having a length sufficient for said tapering second portion to overlay said first end when said web leader is wound on said hub.

From still another aspect thereof, the subject invention resides in an article of manufacture comprising, in combination, web reel means having a pair of spaced circular flange means, a web wound on the web reel means between the spaced circular flange means, means for releasably containing the wound web on the web reel means, including a web leader connected to and wound on the wound web on the web reel means, the web leader being stiffer than the web and at least a portion of the web leader having a width sufficient to extend between and engage both of the flange means to be releasably retained between and by the flange means.

The web leader has a free first end, a first leader portion having a uniform thickness greater than the thickness of said web and extending from said first end to a second leader portion, said second leader portion tapering from said uniform thickness at said first leader portion to a reduced thickness at a second end attached to said web on said web reel means.

From yet another aspect thereof, the subject invention resides in an article of manufacture comprising, in combination, web reel means having a pair of spaced circular resilient flange means, a web wound on said web reel means between said spaced circular flange means, means for releasably containing said wound web on said web reel means, including a first lateral protrusion on one of said flange means extending circularly adjacent a peripheral portion of said one flange means, a second lateral protrusion on the other of said flange means extending circularly adjacent a peripheral portion of said other flange means, said first and second lateral protrusions facing each other and being spaced from each other less than said flange means themselves, said means for releasably containing said wound web further including a web leader connected to and wound on said wound web on said web reel means, said web leader being stiffer than said web and at least a portion of said web leader having a width sufficient to extend between and engage both of said lateral protrusions and to force said lateral protrusions away from each other to be releasably retained between and by said lateral protrusions.

BRIEF DESCRIPTION OF THE DRAWINGS

The subject invention and its various aspects and objects will become readily apparent from the following detailed description of preferred embodiments thereof, illustrated by way of example in the accompanying drawings, in which like reference numerals designate like or functionally equivalent parts, and in which:

FIG. 1 is a foreshortened top view of a leader with attached web according to a first preferred embodiment of the subject invention;

FIG. 2 is a side view of the leader with attached tape according to FIG. 1;

FIG. 3 is a magnified detail view taken within the circle 3 in FIG. 2;

FIG. 4 is a magnified detail view taken within the circle 4 in FIG. 2;

FIG. 5 is a fractional side view of an article of manufacture according to a preferred embodiment of the subject invention, having a web and web leader wound on a hub; and FIG. 6 is a fractional section through an article of manufacture according to a preferred embodiment of the subject invention, having a web and web leader wound on a hub.

DESCRIPTION OF PREFERRED EMBODIMENTS

In principle, the leader shown in the drawings is suitable for tapes, photographic films or other web materials. For the purpose of convenience, and in accordance with the presently contemplated most typical utility of the invention, the illustrated preferred embodiments are disclosed by reference to a leader for magnetic recording tape.

The tape leader 10 shown in the drawings has a free first end 12 and a second end 13. A magnetic recording tape 14 has an end portion 15 attached to the second leader end 13 in a conventional manner. By way of example, the tape 14 may be spliced to the leader end 13 with a conventional thermal butt splicing machine or may otherwise be welded or joined to the second leader end.

The tape 14 may be made of a conventional material, such as an acetate or Mylar in the case of magnetic recording tape. In practice, tapes of the type of tape 14 are quite limp, having typical thicknesses on the order of 0.025 to 0.05 millimeters.

The leader 10 is stiffer than the tape 14. Suitable materials for the leader 10 include, for instance, Nylon, Mylar, polyethylene and polypropylene. The increased stiffness of the leader is realized by a greater thickness thereof relative to the thickness of the tape 14. In practice, it is also possible to make the leader and the tape of different materials to realize a greater stiffness for the leader.

The leader 10 has a first leader portion 17 extending from the free end 12 to a second leader portion 18. The transition of the leader 10 from the first leader portion 17 to the second leader portion 18 is shown in more detail in FIG. 4. As seen in FIGS. 1, 2 and 5, the second leader portion 18 extends from the first portion 17 to the second leader end 13.

The first leader portion 17 has a uniform thickness greater than the thickness of the tape and extending from the free leader end 12 to the second leader portion 18. By way of example, the uniform thickness of the leader portion 17 is on the order of 0.1 to 0.25 millimeters.

The second leader portion 18 tapers from the uniform thickness at the leader portion to a reduced thickness at the second end 13 which is attached to the tape 14. This reduced thickness of the leader portion 18 at the end 13 may be equal to the thickness of the tape 14.

In practice, the taper in the second leader portion 18 may be realized by pressing or rolling the material of the leader. Alternatively or additionally, chemical etching may be employed to reduce the thickness of the leader at the second portion 18. By way of example, a concentrated caustic solution, such as a sodium hydroxide solution, may be employed in the case of a Mylar leader. For instance, the leader is dipped with its second portion 18 into the solution and is moved therein up and down in controlled increments to realize the desired taper.

In accordance with a further important feature of the subject invention, the first leader portion 17 has a length sufficient for the tapering second portion 18 to overlay the first end 16 when the web leader 10 is wound on a cylindrical hub 21, as shown in FIG. 5. In this manner, the leader 10 is formed into and constitutes a cylindrical support for the wound tape 14 on the hub.

It is to be noted at this juncture that the subject invention tolerates bumps in the leader 10 in a radial plane extending through the first end portion 12. However, because of the overlaying function of the tapered leader portion 18 relative to the first end 12 and the bumps in the leader produced thereby, there are no corresponding bumps in the wound tape 14 on the roll of wound leader. Moreover, there are no bumps in the wound tape above the second leader end 13 either. The web or tape 14 being wound onto the previously wound leader 10 on the hub 21 thus encounters a nearly perfect cylindrical surface as if no leader at all were present on the hub 21.

In accordance with a preferred embodiment of the subject invention, the web leader 10, between the first end 12 and a point 23 (see FIG. 5) on the second leader portion 18 located between the first leader portion 17 and the second end 13, has a length equal to an integral number of turns of the web leader on the hub 21. It will be noted from FIG. 5 that the point 23 coincides with a radial plane through the first leader end 12.

As already indicated above, it is the length of the leader portion between the end 12 and the point 23 that is equal to an integral number of turns of the leader on the hub 21.

In practice, the taper of the second leader portion 18 need not be linear, but may have a convexly decreasing or curved configuration, as shown, for instance, in FIG. 4.

In accordance with the illustrated preferred embodiment shown in the drawings, the leader 10 is wider than the web or tape 14 for at least most of the first leader portion. In particular, the leader 10 may have a first region located between the first end 12 and the second leader portion 18 and being wider than the tape 14. According to FIG. 1, this first region extends from the end 12 to a point 25. The leader 10 may then have a second region located between the first region and the second leader end 13 and decreasing in width to the width of the tape 14 at the second end 13. As shown in FIG. 1, this second region may extend from the point 25 to the leader end 13.

In principle, the latter width reduction may proceed by way of a taper. More typically, however, the width reduction is more rapid and may have the configuration of a neck. The second reduced width region extends typically over the second leader portion 18 and part of the first leader portion 17 so that, as seen from the free end 12, the width reduction of the leader occurs prior to the thickness reduction thereof.

Apart from the requirement that the tapered leader portion 18 overlay the first leader end 12 in the wound leader, there are no strict requirements as to the actual length of the leader.

In order to facilitate a self-threading operation, the first leader portion 17 may have a taper at the first end 12 as shown in FIG. 1 at 28. As shown at 29 in FIG. 3, an opaque or other coating may be applied to a surface of the leader 10, in order to render the leader suitable for signaling or control purposes.

In practice, the tape 14 and leader 10 are typically wound and stored on tape reel means 31 having, as shown in FIG. 6, a pair of spaced circular flange means 32 and 33.

In particular, the tape 14 is wound on the web reel between the spaced circular flanges 32 and 33. The web leader 10 serves as a means for releasably containing the wound web on the tape reel. The leader 10 is stiffer than, and connected to, the tape 14 as mentioned above.

As shown in FIG. 6, the leader 10 is wound on the wound tape and at least a portion of the leader 10, such as the above mentioned first region between the end 12 and the point 25 shown in FIG. 1, has a width sufficient to extend between and engage both of the flanges 32 and 33 to be releasably retained between and by these flanges.

The leader 10 may be identical to the leader 10 illustrated in any of the FIGS. 1 to 5 and described above.

The flanges 32 and 33 may be metallic or of a synthetic resin or plastic material. In accordance with a preferred embodiment of the subject invention, the flanges 32 and 33 are resilient and the width of the web leader 10 is sufficient to flex the resilient flanges away from each other. In this manner, the wound leader is releasably retained between the flanges and, in turn, contains the wound tape on the reel 31.

According to the preferred embodiment shown in FIG. 6, each of the flanges 32 and 33 has a lateral protrusion 35 and 36 extending circularly adjacent a peripheral portion 37 and 38, respectively, of the particular flange. In particular, a first lateral protrusion 35 on one of the flanges 32 extends circularly adjacent a peripheral portion 37 of that one flange 32, and a second lateral protrusion 36 on the other flange 33 extends. As shown in FIG. 6, the first and second lateral protrusions 35 and 36 on both flanges 32 and 33 face each other and are spaced from each other less than the flanges themselves.

The leader 10 has a width sufficient to extend between and to engage the lateral protrusions 35 and 36 to be releasably retained between and by these protrusions.

In accordance with a further preferred embodiment of the subject invention, the flanges include means for yieldably mounting the lateral protrusions 35 and 36 and the width of the leader portion between the end 12 and the point 25 (see FIG. 1) is sufficient to force the lateral protrusions 35 and 36 shown in FIG. 6 away from each other.

In practice, annular springs may be employed for yieldably mounting the protrusions 35 and 36. However, pursuant to FIG. 6, the thinner portions of the flanges 32 and 33 below or inward from the protrusions 35 and 36 may themselves constitute the means for yieldably mounting those lateral protrusions.

The tape leader 10, when wound onto the roll of tape 14 on the reel 31, is forced between the yieldable protrusions 35 and 36 and, consequently, is releasably retained by the slightly forced-apart protrusions 35 and 36 whereby to contain the tape 14 in the roll on the reel as in a tape cartridge.

When used for recording, playback or other purposes, the leader 10 is removed from the reel 31 and may be wound onto the hub 21 as shown in FIG. 5 and described above. The tape 14 may thereupon be unwound from the reel 31 and wound onto the smooth cylindrical support provided by the wound leader 10 on the hub 21 as shown in FIG. 5 and as described above.

The subject extensive disclosure will suggest or render apparent various modifications and variations within the spirit and scope of the subject invention to those skilled in the art.

I claim:

1. An article of manufacture comprising in combination:
    web winding means having a cylindrical hub;
    a web wound on said hub;
    a web leader wound on said hub between said hub and said web and being stiffer than said web, said web leader having a first end at said hub, a first leader portion having a uniform thickness greater than the thickness of said web and extending from said first end to a second leader portion, and second leader portion tapering from said uniform thickness at said first leader portion to a reduced thickness at a second end attached to said web, and said tapering second leader portion overlaying said first end.

2. An article of manufacture as claimed in claim 1, wherein:
    said reduced thickness at said second end is equal to the thickness of said web.

3. An article of manufacture as claimed in claim 1, wherein:

said web leader between said hub and said web constitutes a cylindrical support for said wound web on said hub.

4. An article of manufacture as claimed in claim 1, wherein:
said web leader, between said first end and a point on said second leader portion located between said first leader portion and said second end, has a length equal to an integral number of turns of said web leader on said hub.

5. An article of manufacture as claimed in claim 1, wherein:
said web leader is wider than said web for at least most of said first leader portion.

6. An article of manufacture as claimed in claim 1, wherein:
said web leader has a first region located between said first end and said second leader portion and being wider than said web, and a second region located between said first region and said second end and decreasing in width to the width of said web at said second end.

7. An article of manufacture as claimed in claim 6, wherein:
said second region extends over said second leader portion and part of said first leader portion.

8. An article of manufacture as claimed in claim 1, wherein:
said first leader portion has a taper at said first end.

9. A method of facilitating the winding of a web on a given hub, comprising in combination the steps of:
providing a web leader with a stiffness higher than the stiffness of said web;
providing said web leader with a first leader portion having between a first leader end and a second leader portion a uniform thickness greater than the thickness of said web;
tapering said second leader portion from said uniform thickness at said first leader portion to a reduced thickness at a second leader end;
attaching said web to said second leader end;
winding said web leader on said hub with said first end being located at said hub and being overlaid with said tapered second leader portion; and
winding said web on said wound web leader on said hub.

10. A method as claimed in claim 9, wherein:
said reduced thickness at said second leader end is made equal to the thickness of said web.

11. A method as claimed in claim 9, wherein:
said web leader is formed into a cylindrical support for said web on said hub.

12. A method as claimed in claim 9, wherein:
said web leader, between said first end and a point on said second leader portion located between said first leader portion and said second end, is made equal in length to an integral number of turns of said web leader wound on said hub.

13. A method as claimed in claim 9, wherein:
said web leader is made wider than said web for at least most of said first leader portion.

14. A method as claimed in claim 9, wherein:
said web leader is provided with a first region located between said first end and said second leader portion and being made wider than said web, and with a second region located between said first region and said second end and decreasing in width to the width of said web at said second end.

15. A method as claimed in claim 14, wherein:
said second region is made to extend over said second leader portion and part of said first leader portion.

16. A method as claimed in claim 9, wherein:
said first leader portion is provided with a taper at said first end.

17. An article of manufacture for facilitating the winding of a web on a cylindrical hub, comprising:
a web leader being stiffer than said web and having a first end, said web leader having a first leader portion having a uniform thickness greater than the thickness of said web and extending from said first end to a second leader portion, said second leader portion tapering from said uniform thickness at said first leader portion to a reduced thickness at a second end attachable to said web, with said first leader portion having a length sufficient for said tapering second portion to overlay said first end when said web leader is wound on said hub.

18. An article of manufacture as claimed in claim 17, wherein:
said reduced thickness at said second end is equal to the thickness of said web.

19. An article of manufacture as claimed in claim 17, wherein:
said web leader, between said first end and a point on said second leader portion located between said first leader portion and said second end, has a length equal to an integral number of turns of said web leader on said hub when said web leader is wound on said hub.

20. An article of manufacture as claimed in claim 17, wherein:
said web leader is wider than said web for at least most of said first leader portion.

21. An article of manufacture as claimed in claim 17, wherein:
said web leader has a first region located between said first end and said second leader portion and being wider than said web, and a second region located between said first region and said second end and decreasing in width to the width of said web at said second end.

22. An article of manufacture as claimed in claim 21, wherein:
said second region extends over said second leader portion and part of said first leader portion.

23. An article of manufacture as claimed in claim 17, wherein:
said first leader portion has a taper at said first end.

24. An article of manufacture comprising in combination:
web reel means having a pair of spaced circular resilient flange means;
a web wound on said web reel means between said spaced circular flange means;
means for releasably containing said wound web on said web reel means, including a first lateral protrusion on one of said flange means extending circularly adjacent a peripheral portion of said one flange means, a second lateral protrusion on the other of said flange means extending circularly adjacent a peripheral portion of said other flange means, said first and second lateral protrusions facing each other and being spaced from each other less than said flange means themselves, said means for releasably containing said wound web further including a web leader connected to and wound on said wound web on said web reel means, said web leader being stiffer than said web and at least a portion of said web leader having a width sufficient to extend between and engage both of said lateral protrusions and to force said lateral protrusions away from each other to be releasably retained between and by said lateral protrusions.

25. An article of manufacture comprising in combination:
- web reel means having a pair of spaced circular flange means;
- a web wound on said web reel means between said spaced circular flange means;
- means for releasably containing said wound web on said web reel means, including a web leader connected to and wound on said wound web on said web reel means, said web leader being stiffer than said web and at least a portion of said web leader having a width sufficient to extend between and engage both of said flange means to be releasably retained between and by said flange means; and
- said web leader having a free first end, a first leader portion having a uniform thickness greater than the thickness of said web and extending from said first end to a second leader portion, said second leader portion tapering from said uniform thickness at said first leader portion to a reduced thickness at a second end attached to said web on said web reel means.

26. An article of manufacture as claimed in claim 25, wherein:
said reduced thickness at said second end is equal to the thickness of said web.

27. An article of manufacture as claimed in claim 25, wherein:
said web leader is wider than said web for at least most of said first leader portion.

28. An article of manufacture as claimed in claim 25, wherein:
said web leader has a first region located between said first end and said second leader portion and being wider than said web, and a second region located between said first region and said second end and decreasing in width to the width of said web at said second end.

29. An article of manufacture as claimed in claim 28, wherein:
said second region extends over said second leader portion and part of said first leader portion.

30. An article of manufacture as claimed in claim 25, wherein:
said first leader portion has a taper at said first end.

* * * * *